US 6,603,465 B1

(12) United States Patent
Hashimoto et al.

(10) Patent No.: US 6,603,465 B1
(45) Date of Patent: *Aug. 5, 2003

(54) ROBOT CONTROLLER

(75) Inventors: Yoshiki Hashimoto, Hadano (JP);
Takehisa Sera, Oshino-mura (JP);
Yasuhiro Matsuo, Oshino-mura (JP)

(73) Assignee: Fanuc Ltd., Yamanashi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/068,228

(22) PCT Filed: Sep. 8, 1997

(86) PCT No.: PCT/JP97/03161

§ 371 (c)(1),
(2), (4) Date: May 5, 1998

(87) PCT Pub. No.: WO98/09778

PCT Pub. Date: Mar. 12, 1998

(30) Foreign Application Priority Data

Sep. 6, 1996 (JP) ................................................ 8-255273

(51) Int. Cl.⁷ .................................................. G09G 5/00
(52) U.S. Cl. ........................ 345/204; 345/212; 345/213
(58) Field of Search ................................. 345/204, 211, 345/212, 213, 214; 364/191, 513; 340/825.06

(56) References Cited

U.S. PATENT DOCUMENTS

| | | | | | |
|---|---|---|---|---|---|
| 4,672,280 A | * | 6/1987 | Honjo | .......................... | 318/587 |
| 4,773,025 A | * | 9/1988 | Penkar et al. | ................. | 364/513 |
| 4,862,152 A | * | 8/1989 | Milner | ......................... | 340/712 |
| 4,870,590 A | * | 9/1989 | Kawata et al. | ................ | 364/468 |
| 4,881,177 A | * | 11/1989 | McClean et al. | ............ | 364/513 |
| 5,079,491 A | * | 1/1992 | Nose et al. | ................... | 318/577 |
| 5,565,854 A | * | 10/1996 | Kataoka et al. | ......... | 340/825.06 |
| 5,623,428 A | * | 4/1997 | Kunii et al. | ................. | 364/758 |
| 5,790,401 A | * | 8/1998 | Shields | ......................... | 364/191 |
| 5,917,461 A | * | 6/1999 | Sakami et al. | ................. | 345/29 |
| 5,945,983 A | * | 8/1999 | Kanno et al. | ................ | 345/204 |
| 5,986,641 A | * | 11/1999 | Shimamoto | .................. | 345/150 |

FOREIGN PATENT DOCUMENTS

| | | |
|---|---|---|
| JP | 62-154697 | 7/1987 |
| JP | 63-108411 | 5/1988 |
| JP | 3-192404 | 8/1991 |
| JP | 4-106588 | 4/1992 |
| JP | 4-122137 | 4/1992 |
| JP | 5-173626 | 7/1993 |
| JP | 5-241633 | 9/1993 |
| JP | 6-262558 | 9/1994 |
| JP | 7-121216 | 5/1995 |

* cited by examiner

Primary Examiner—Vijay Shankar
(74) Attorney, Agent, or Firm—Staas & Halsey LLP

(57) ABSTRACT

A robot controller (10) includes a VGA controller (11) which transmits 15-bit image data at cycles of 25 MHZ. A code converter (12) converts 15-bit image data into 20-bit image data and transmits, to a driver (13), 10-bit image data at cycles of 50 MHZ. The driver (13) converts image data into serial data, and then transmits the serial data to a twisted pair line (30). Image data received by a receiver (21) of a display unit (20) is, by a code converter (22), converted into 15-bit data and transmitted to a liquid crystal display (23) at cycles of 25 MHZ. The driver (13) and the receiver (21) have a phase lock circuit adapted to Fibre Channel (500 Mbps) and arranged for phasing the both with each other.

8 Claims, 3 Drawing Sheets

PRIOR ART

ROBOT CONTROLLER

TECHNICAL FIELD

The present invention relates to a robot controller having a display unit disposed apart from a body of a robot controller.

BACKGROUND OF THE INVENTION

To display image data on a display unit, it is necessary to connect a graphic control circuit (Video Graphics Array, VGA) adapted to the interface of the display unit to the display unit. To transmit image data from the VGA controller to the display unit, there are a method using a digital VGA controller to transmit data in the form of a digital signal and a method using an analog VGA controller to transmit data in the form of an analog signal.

When the digital VGA controller is employed, each of R (red), G (green) and B (blue) color signals is composed of four bits, as shown in FIG. 3. A horizontal synchronizing signal (HSYNC), a vertical synchronizing signal (VSYNC) and a data enable signal (DE) are required as synchronizing signals. Thus, fifteen signal lines are required.

When the analog VGA controller is employed, R, G, B color signals are transmitted in the form of analog signals from the VGA controller to the display unit through three signal lines. Then, the analog signal undergoes A/D conversion on the display unit side for adaption to the interface of the display unit. One signal line is required for each of the horizontal synchronizing signal (HSYNC) and the vertical synchronizing signal (VSYNC). Moreover, a data enable signal (DE) must sometimes be transmitted, requiring therefore five or six signal lines in total.

Industrial robots use a variety of data which must be displayed on the display unit. When image data transmitted from a VGA controller of a card personal computer or the like mounted on a robot control unit is displayed on the display unit, 15 signal lines are required for the digital VGA controller and 5 (or 6) signal lines are required for the analog VGA controller as described above.

A digital VGA controller transmits signals accurately because the signals transmitted are digital. However, in the case where a display unit is disposed separated from the body of a robot controller, mere extension of a signal line would hinder normal transmission of signals because signals from a digital VGA are of TTL (Transistor-Transistor-Logic) level so that they tend to lower in level in the signal line. Therefore, the signal has to be transmitted in the form of a differential output (that is, data is transmitted based on the difference between each signal and an inversion signal of the signal). In order to do so, signal lines for transmitting the inversion signals are required, thus causing the number of signal lines to be doubled. For example, in the case of the system shown in FIG. 3, the number of signal lines will be impractical number of lines (15×20).

On the other hand, in the case of the analog VGA controller, the number of the signal lines can be reduced, but the A/D converter is required as described above, and this requires the use of coaxial cable having a larger diameter and thus being less flexible in handling when the display unit such as a teaching pendant has to be held by a hand for operation. Since signal to be transmitted is analog, the signal level is lowered and thus the number of colors which can be displayed is limited, and further, differences in delays are produced among each color so that deviation from synchronization takes place.

SUMMARY OF THE INVENTION

An object of the present invention is to provide a robot controller capable of accurately transmitting image data and employing a flexible cable even if a display unit is disposed apart from a body of the robot controller.

To achieve the above-mentioned object, in a robot controller according to one aspect of the present invention, a display unit is separated from the body of the robot controller, the body of the robot controller and the display unit are connected to each other through a twisted pair line or a coaxial cable, and image data from a graphic control circuit provided on the body of the robot controller is converted into serial data and transmitted to the display unit.

Further, in a robot controller according to the other aspect of the present invention, a display unit is separated from the body of the robot controller, a driver provided on the body of the robot controller and a receiver provided on the display unit are connected to each other through a twisted pair line or a coaxial cable, the driver and the receiver are provided with a phase-locked loop circuit for phasing the both with each other, and image data supplied from a graphic control circuit provided on the body of the robot controller is divided into two sections so that high speed serial communication can be performed at double speed.

Further, in a robot controller according to still other aspect of the present invention, wherein a display unit is separated from the body of the robot controller, and the body of the robot controller and the display unit are connected to each other through a twisted pair line or a coaxial cable. And the body of the robot controller comprises: a latch circuit for latching image data transmitted from the graphic control circuit by a quantity corresponding to several pixels; a RAM for sequentially storing image data corresponding to several pixels latched by the latch circuit; a driver for sequentially transmitting, to the twisted pair line or the coaxial cable, image data corresponding to several pixels stored in the RAM; and a control circuit for controlling the latching of image data to be performed by the latch circuit, writing and reading of image data to and from the RAM and transmission of image data corresponding to several pixels from the RAM to the twisted pair line or the coaxial cable by the driver. And the display unit comprises: a receiver connected to the twisted pair line or the coaxial cable; a RAM for sequentially storing image data for several pixels received by the receiver; a latch circuit for latching image data for several pixels read from the RAM and transmitting image data for one pixel at a time to a display unit; a display unit itself; and a control circuit for controlling writing and reading of image data for several pixels supplied from the receiver on and from the RAM, latching of image data for several pixels to be performed by the latch circuit, and separating and transmitting of image data for one pixel from image data for the plurality of pixels latched by the latch circuit so that high speed serial communication can be performed.

The present invention is designed so that image data is transmitted to the display unit by high speed serial communication, and, moreover, the transmission line is of the twisted pair line or the coaxial cable having small number of cores. Therefore, an accurate image can be obtained and the cable has a sufficient flexibility, so that the operability of a teaching pendant or the like, on which the display unit is mounted, can be improved.

PREFERRED EMBODIMENTS OF THE INVENTION

The present invention is designed for high-speed serial communication of data between the body of a robot controller and a display unit. The high speed serial communication is standardized, for example, by Fibre Channel (500 Mbps), IEEE1394 (100 Mbps) or the like.

Figure 1:
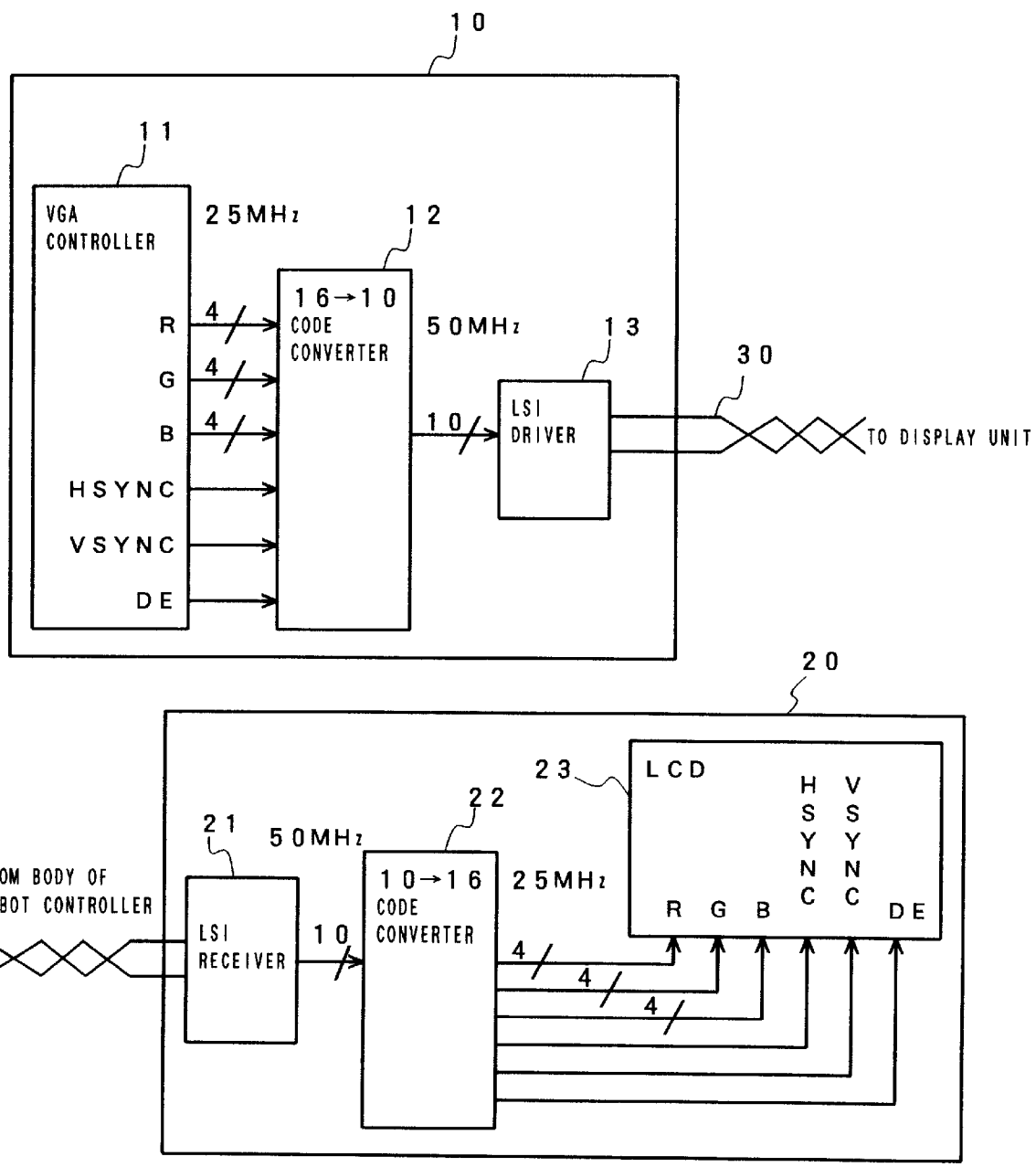
FIG. 1 is a block diagram showing an essential part of a first embodiment of the present invention.

FIG. 1 is a block diagram showing an embodiment of the present invention in which transmission is performed by the Fibre Channel (500 Mbps).

A body 10 of the robot controller has a code converter 12 for converting 16-bit image data transmitted from a VGA controller 11 of a card type personal computer or the like provided on the body 10 of the robot controller into 10-bit data, and a driver 13 for Fibre Channel (500 Mbps) designed to transmit data supplied from the code converter 12 to a transmission line. A display unit 20 comprises a receiver 21 for Fibre Channel (500 Mbps), which receives data from the transmission line, a code converter 22 for converting 10-bit data supplied from the receiver 21 into 16-bit data, and a liquid crystal display (LCD) unit 23 for displaying an image in accordance with data supplied from the code converter 22. A transmission line for establishing the connection between the body 10 of the robot controller and the display unit 20 is of a twisted pair line.

Four-bit color signal for each of R, G and B is parallelly transmitted from the VGA controller 11 at cycles of 25 MHZ. Synchronizing signals, namely, a horizontal synchronizing signal (HSYNC) and a vertical synchronizing signal (VSYNC), and a data enable signal (DE) are transmitted from the VGA controller 11. Although the code converter 12 receives 15-bit parallel input signal data, one bit for blank input signal is provided, so that input signal data is formed into a 16-bit input signal data. This 16-bit data is converted into 10-bit data. Thus, 10-bit parallel signal data is transmitted at cycles of 50 MHZ. That is, 4-bit data which is input at cycles of 25 MHZ is converted into 5-bit data. Thus, 16-bit data is converted into 20-bit data, which is divided into 10-bit data so that 10-bit parallel signal data is transmitted twice at cycles of 50 MHZ, double the 25 MHZ.

The driver 13 converts 10-bit parallel signal data into serial signal data, and then transmits the same to a twisted pair line 30. That is, the driver 13 and the receiver 21 have a PLL (Phase-Locked Loop) circuit for phasing the signals of the driver 13 and the receiver 21 with each other. Since the phase locked by the PLL circuit is unlocked if four signals having a level of "1" (high level) or "0" (low level) appear successively, the code converter 12 adjusts one bit produced when increasing from four bit to five bit, in order that the level of "1" or "0" does not successively appear.

The receiver 21 of the display unit 20 receives 10-bit data at cycles of 50 MHZ from the twisted pair line 30, and then converts 10-bit data into parallel signal data which is transmitted to the code converter 22. The code converter 22 receives 10-bit parallel signal data two times so as to convert the signals in 5-bit unit into 4-bit signals, forming 16 bit signals in total. Thus, the code converter 22 transmits, to the liquid crystal display (LCD) unit 23, a 4-bit color signal for R (red), a 4-bit color signal for G (green), a 4-bit color signal for B (blue), a horizontal synchronizing signal (HSYNC), a vertical synchronizing signal (VSYNC) and a data enable signal (DE) at cycles of 25 MHZ. In accordance with the received image signals, the liquid crystal display (LCD) unit 23 displays an image similarly to the conventional system.

In this embodiment, image data is transmitted in the form of digital signal from the body 10 of the robot controller to the display unit 20 by high speed serial communication conforming to Fibre Channel (500 Mbps) standard, and, therefore, image does not deteriorate. Since the transmission line is a twisted pair line, the transmission line has a sufficient flexibility even when the display unit is mounted on a teaching pendant, and even when the teaching pendant is held by the hand of an operator for operation, the operability of the teaching pendant is not adversely affected. A coaxial cable may be employed in place of twisted pair lines. In that case, as the number of cores can be reduced, the overall outer diameter of the cable can be reduced. Thus, flexibility of the coaxial cable can be realized and thus deterioration in the operability of the teaching pendant or the like can be prevented.

Figure 2:
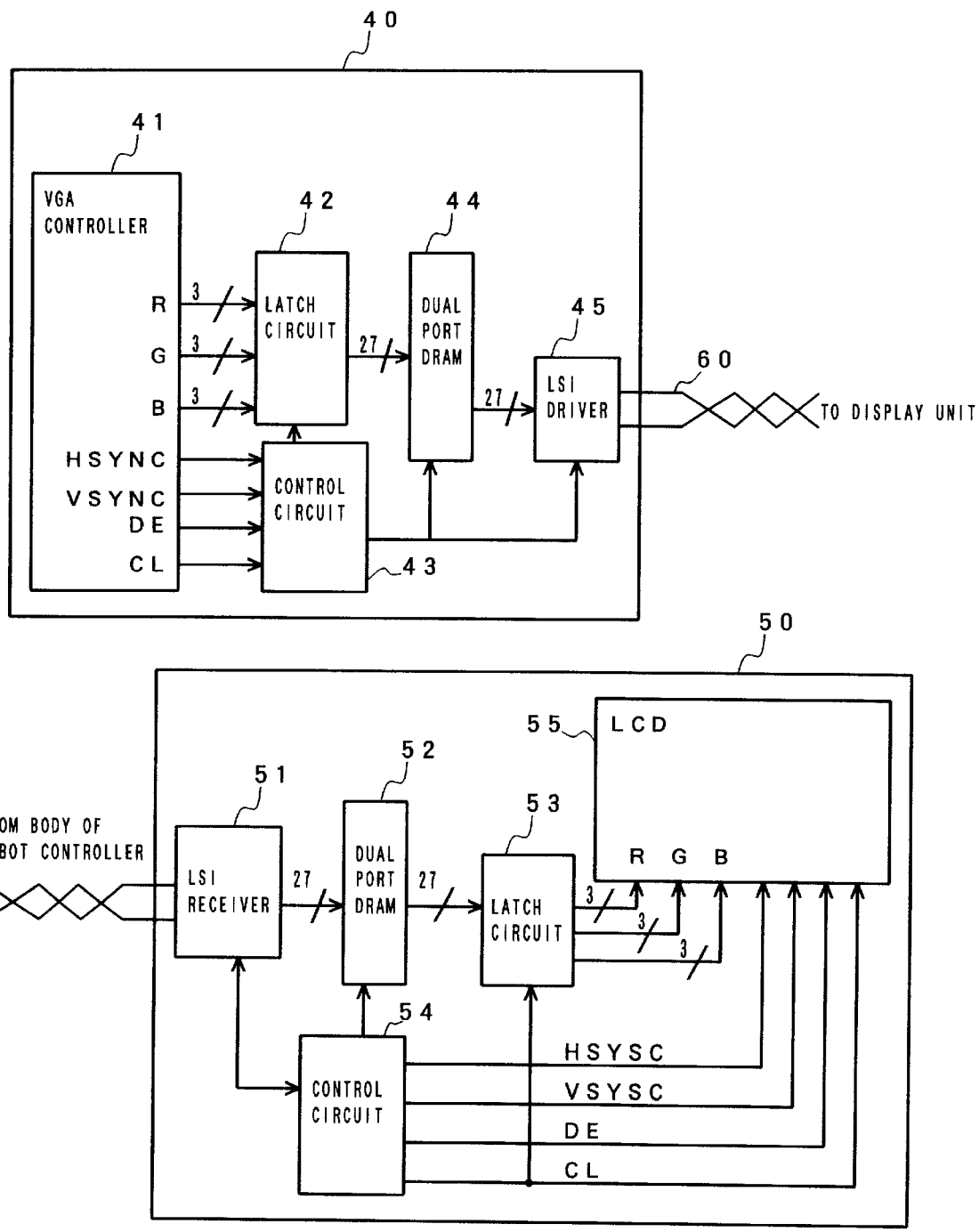
FIG. 2 is a block diagram showing an essential part of a second embodiment of the present invention.
Figure 3:
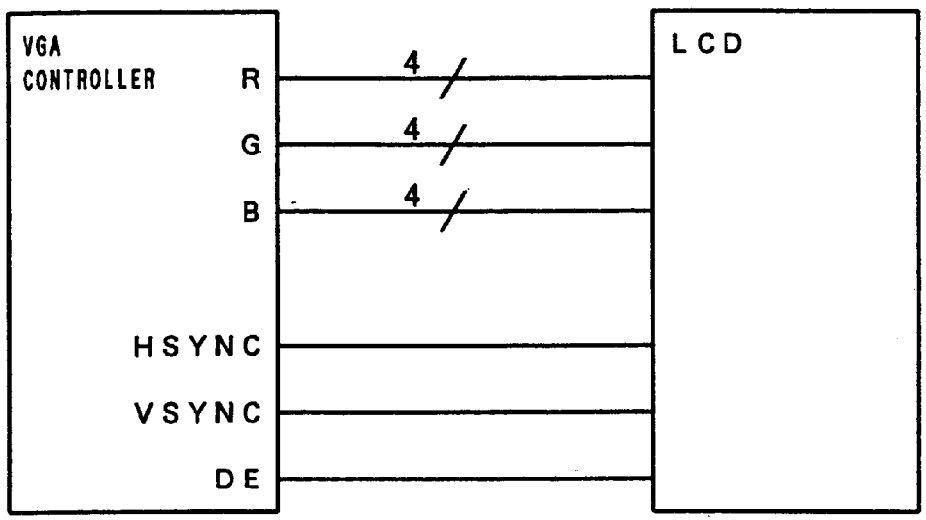
FIG. 3 is a diagram showing a conventional method of transmitting image data from a digital VGA.
Figure 4:
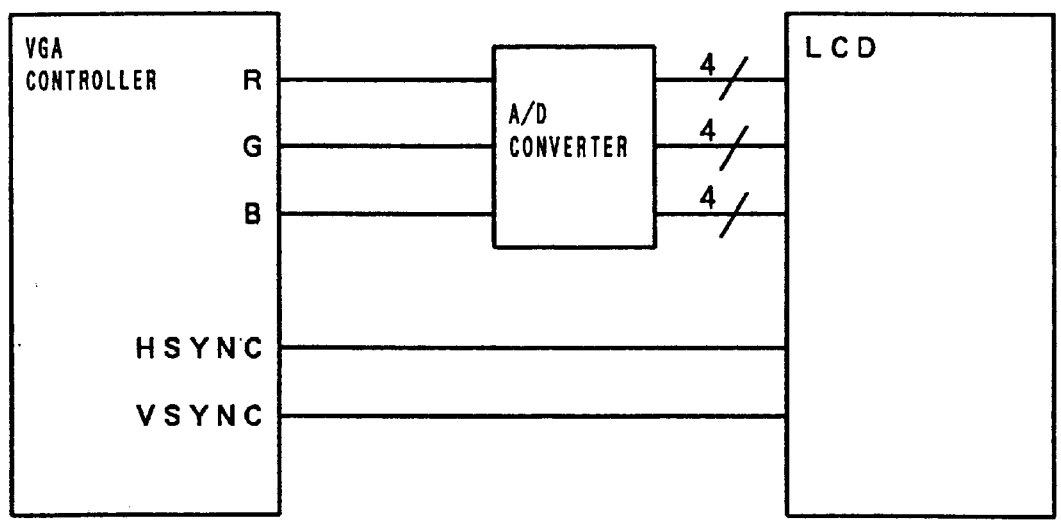
FIG. 4 is a diagram showing a conventional method of transmitting image information from an analog VGA.

FIG. 2 is a block diagram showing a second embodiment of the present invention having a structure conforming to IEEE1394 (100 Mbps) standard for a high speed communication.

In the second embodiment, a body 40 of a robot controller has a digital VGA controller 41, which outputs 3-bit color signals for R, G, and B images, 1-bit horizontal synchronizing signal (HSYNC), vertical synchronizing signal (VSYNC) and data enable signal (DE). The R, G, and B signals are supplied to a latch circuit 42 parallelly which latches the signal for 3 pixels. The horizontal synchronizing signal (HSYNC), the vertical synchronizing signal (VSYNC), the data enable signal (DE) and a dot clock CL are supplied to a control circuit 43. The latch circuit 42 parallelly transmits 27-bit (3 bits×3 colors (red, green and blue)×3 pixels=27 bits) signals for 3 pixels, which are parallelly input to a dual port DRAM 44. In accordance with an address signal, a writing signal and reading signal transmitted from the control circuit 43, input data is sequentially written in the regions having instructed addresses and is sequentially read therefrom. 27-bit data read from the dual port DRAM 44 is supplied to a driver 45 for the IEEE1394 (100 Mbps), converted into serial data and transmitted to a transmission line which is a twisted pair line 60.

A display unit 50 comprises a receiver 51 for IEEE1394 (100 Mbps) connected to the twisted pair line 60, a dual port DRAM 52 for receiving R, G, and B signal data transmitted from the receiver 51, a latch circuit 53 for receiving 27-bit data transmitted from the dual port DRAM 52, a control circuit 54 for generating a dot clock CL, an address signal, a writing signal, a reading signal, a horizontal synchronizing signal (HSYNC), a vertical synchronizing signal (VSYNC) and a data enable signal (DE), which are transmitted to the dual port DRAM 52 in accordance with a signal supplied from the receiver 51, and a liquid crystal display (LCD) unit 55.

The digital VGA controller 41 of the body 40 of the robot controller transmits, to the latch circuit 42, 3-bit color signals for one pixel for R, G, and B at each dot clock CL. Moreover, the digital VGA controller 41 transmits, to the control circuit 43, horizontal synchronizing signal (HSYNC), vertical synchronizing signal (VSYNC), data enable signal (DE) and output dot clock CL. In accordance with the input signals, the control circuit 43 produces and outputs dot clock CL to the latch circuit 42, a writing signal and reading signal to the dual port DRAM 44 and sequentially updated address signals corresponding to the writing signal and the reading signal at a rate of ⅓ of the number of the dot clocks CL. Moreover, the control circuit 43 produces and outputs a writing signal to the driver 45.

As a result, 3-bit color data for R, G, and B is latched by the latch circuit 42 with each dot clock CL. When color data for 3 pixels has been latched in response to the three dot clocks CL, the writing signal is input to the dual port DRAM 44, causing 27-bit image data for 3 pixels to be written in the designated writing addresses which are sequentially updated. Moreover, 27-bit data for 3 pixels are output from the addresses which are sequentially updated in response to the reading signal. In response to the writing signal supplied from the control circuit 43, the driver 45 reads the data to generate serial data conforming to the protocol of IEEE1394, which is to be transmitted to the twisted pair line 60.

The receiver 51 of the display unit 50 receives image data from the twisted pair line 60. The control circuit 54 produces a horizontal synchronizing signal (HSYNC), a vertical synchronizing signal (VSYNC), a data enable signal (DE) and a dot clock CL and transmit the same to the liquid crystal display unit 55. Moreover, the control circuit 54 transmits a dot clock CL to the latch circuit 53.

The receiver 51 converts received 27-bit image data from serial data to parallel data for transmission to the dual port DRAM 52. In response to the writing signal output from the control circuit 54, the dual port DRAM 52 stores the data at the writing address, which is sequentially updated and from which the stored data is output. Further, the dual port DRAM 52 reads 27-bit image data from the reading address in response to the reading signal and the reading address supplied from the control circuit 54 and transmits the same to the latch circuit 53. In response to the dot clock CL transmitted from the control circuit 54, the latch circuit 53 divides 27-bit data for 3 portions for output to the liquid crystal display (LCD) unit 55, the three portions constituting 3-bit red signal, 3-bit green signal and 3-bit blue signal respectively, each being for single pixel. Thus, the liquid crystal display unit 55 supplied with image data displays an image similarly to the conventional system.

The second embodiment is also free from deterioration of signal during transmission owing to high speed serial communication using a serial digital signal. For instance, even when the body 40 of the robot controller and the display unit 50 are operated at a distance from each other, accurate communication can be performed. Furthermore, as a twisted pair line is employed as the transmission line, the cable has a sufficient flexibility. Therefore, even when a display unit is incorporated into a teaching pendant or the like which is held by operator's hand, deterioration in the operability can be prevented.

What is claimed is:

1. A robot controller, in which a display unit is separated from the body of said robot controller, and said body of the robot controller and said display unit being connected to each other through a twisted pair line or a coaxial cable,
said body of the robot controller having:
  a graphic control circuit;
  a first latch circuit to latch image data transmitted from said graphic control circuit by a quantity corresponding to several pixels;
  a first RAM to sequentially store image data corresponding to the several pixels latched by said first latch circuit;
  a driver to sequentially transmit, to said twisted pair line or said coaxial cable, the image data corresponding to several pixels stored in said first RAM; and
  a control circuit to control the latching of the image data to be performed by said first latch circuit, writing and reading of the image data to and from said first RAM and transmission of the image data corresponding to several pixels from said first RAM to said twisted pair line or said coaxial cable by said driver;
said display unit having:
  a receiver connected to said twisted pair line or said coaxial cable;
  a second RAM to sequentially store the image data for several pixels received by said receiver and transmitted by said driver;
  a second latch circuit to latch the image data for several pixels read from said second RAM and to transmit image data for one pixel at a time to a display;
said display; and
a control circuit to control writing and reading of the image data for several pixels supplied from said receiver on and from said second RAM, latching of the image data for several pixels to be performed by said second latch circuit, and to separate and transmit image data for one pixel from the image data for several pixels latched by said second latch circuit so that high speed serial communication can be performed.

2. A robot controller, in which a display unit is separated from the body of the robot controller, said body of the robot controller and said display unit are connected to each other through a twisted pair line or a coaxial cable, said display unit being mounted on a teaching pendant, and image data supplied from a graphic control circuit provided on said body of said robot controller is converted into serial data and transmitted to said display unit.

3. The robot controller of claim 1, wherein the coaxial cable is a reduced core and overall reduced outer diameter coaxial cable.

4. The robot controller of claim 1, wherein the robot controller further includes a code converter to convert the image data to a different bit length before the image data is converted into serial data and transmitted to said display unit.

5. A robot controller, in which a display unit is separated from the body of the robot controller, a driver provided on said body of the robot controller and a receiver provided on said display unit are connected to each other through a twisted pair line or a coaxial cable, said display unit being mounted on a teaching pendant, said driver and said receiver being provided with a phase-locked loop circuit to phase-lock an output of the driver with an input of the receiver, and said driver also being provided with a converter unit to divide the image data supplied from a graphic control circuit, provided on said body of the robot controller, into two sections so that high speed serial communication can be performed at double speed.

6. The method of displaying image data for a robot controller, where the display unit is separated from the body of the robot controller and mounted on a teaching pendant, comprising:
  connecting the robot controller and the display by a twisted pair line or a coaxial cable;
  converting a plurality of parallel pixel image data of the robot controller into serial image data;
  transferring the serial image data from the robot controller to the display unit via the twisted pair or coaxial cable;
  converting the received serial image data into parallel image data; and
  displaying the parallel image data on the display unit.

7. The method of displaying image data for a robot controller of claim 6, wherein the serial data transferred between the robot controller and the display is phase-locked.

8. The method of displaying image data for a robot controller of claim 6, wherein the converting a plurality of parallel pixel image data of the robot controller into serial image data further includes converting the parallel image data into different bit lengths before the image data is converted into serial data.

* * * * *